United States Patent
Takizawa et al.

(10) Patent No.: US 12,338,859 B2
(45) Date of Patent: Jun. 24, 2025

(54) ROLLING BEARING

(71) Applicants: STT INC., Kanagawa (JP); NTN CORPORATION, Osaka (JP)

(72) Inventors: Shinichi Takizawa, Kanagawa (JP); Hitoshi Nakamura, Kanagawa (JP); Hayato Kawaguchi, Shizuoka (JP); Toshiki Masuda, Shizuoka (JP)

(73) Assignees: STT INC., Kanagawa (JP); NTN CORPORATION, Osaka (JP)

( * ) Notice: Subject to any disclaimer, the term of this patent is extended or adjusted under 35 U.S.C. 154(b) by 0 days.

(21) Appl. No.: 18/268,242

(22) PCT Filed: Dec. 22, 2021

(86) PCT No.: PCT/JP2021/047719
§ 371 (c)(1),
(2) Date: Jun. 18, 2023

(87) PCT Pub. No.: WO2022/138772
PCT Pub. Date: Jun. 30, 2022

(65) Prior Publication Data
US 2024/0052887 A1    Feb. 15, 2024

(30) Foreign Application Priority Data
Dec. 25, 2020 (JP) .................. 2020-217269

(51) Int. Cl.
*F16C 19/06* (2006.01)
*F16C 33/62* (2006.01)
(Continued)

(52) U.S. Cl.
CPC ............. *F16C 33/62* (2013.01); *F16C 19/06* (2013.01); *F16C 33/6696* (2013.01);
(Continued)

(58) Field of Classification Search
CPC ...... F16C 19/06; F16C 33/62; F16C 33/1095; F16C 33/6696; F16C 35/073;
(Continued)

(56) References Cited

U.S. PATENT DOCUMENTS

| 5,207,513 A | * | 5/1993 | Kondo | ............... F16C 33/6696 384/492 |
| 2010/0322547 A1 | | 12/2010 | Mastsushita | |
| 2020/0141447 A1 | * | 5/2020 | Motoda | ................. F16C 33/201 |

FOREIGN PATENT DOCUMENTS

| CN | 109642615 A | 4/2019 |
| EP | 2189670 A1 | 5/2010 |

(Continued)

OTHER PUBLICATIONS

Machine translation of JP 6338035 B dated Jun. 6, 2018.
Machine translation of JP 6-80025 U1 dated Nov. 8, 1994.
Machine translation of JP 2019-23509 A dated Feb. 14, 2019.
Machine translation of JP 2009-68676 A dated Apr. 2, 2009.
Machine translation of JP 2007-2912 A dated Jan. 11, 2007.
Machine translation of JP 2001-200855 A dated Jul. 27, 2001.
Machine translation of Abstract of CN 109642615 A dated Apr. 16, 2019

*Primary Examiner* — Phillip A Johnson
(74) *Attorney, Agent, or Firm* — Hedman & Costigan, P.C.; James V. Costigan; Kathleen A. Costigan (57) ABSTRACT

A rolling bearing 1 includes an inner ring 2 and an outer ring 3 that are raceway rings, and a plurality of balls 4 interposed between the inner ring and the outer ring. The outer ring 3 is fitted to a housing 10. The rolling bearing 1 includes a surface coating film 8 on an outer ring outer diametrical surface 3a that is a fitting surface with the housing 10. The surface coating film 8 contains: a binder containing two or more kinds of thermosetting resins having different average molecular weights; and a solid lubricant. The solid lubricant contains molybdenum disulfide, polytetrafluoroethylene resin, and graphite.

10 Claims, 5 Drawing Sheets

(51) Int. Cl.
    *F16C 33/66*     (2006.01)
    *F16C 35/073*     (2006.01)
    *F16C 35/077*     (2006.01)

(52) U.S. Cl.
    CPC .......... *F16C 35/073* (2013.01); *F16C 35/077* (2013.01); *F16C 2208/32* (2013.01); *F16C 2208/60* (2013.01); *F16C 2208/80* (2013.01); *F16C 2240/54* (2013.01); *F16C 2240/60* (2013.01); *F16C 2361/65* (2013.01)

(58) Field of Classification Search
    CPC ................ F16C 35/077; F16C 2208/32; F16C 2208/60; F16C 2208/80; F16C 2240/54; F16C 2240/60; F16C 2361/65
    See application file for complete search history.

(56) References Cited

FOREIGN PATENT DOCUMENTS

| | | | |
|---|---|---|---|
| EP | 3505783 A1 | | 7/2019 |
| JP | 6-80025 U1 | | 11/1994 |
| JP | 2001-200855 A | | 7/2001 |
| JP | 2002327756 A | * | 11/2002 |
| JP | 2005048927 A | * | 2/2005 |
| JP | 2007-2912 A | | 1/2007 |
| JP | 2009-68676 A | | 4/2009 |
| JP | 6338035 B | | 6/2018 |
| JP | 2019-23509 A | | 2/2019 |
| WO | 2009/037959 A1 | | 3/2009 |
| WO | 2018/038241 A1 | | 3/2018 |

* cited by examiner

ROLLING BEARING

TECHNICAL FIELD

The present invention relates to a rolling bearing, in particular, an automobile rolling bearing for supporting a shaft of an automobile transmission or a motor shaft.

BACKGROUND ART

In recent years, in an industrial field such as an automobile field, downsizing and lightening of a rotary machine have been promoted for saving energy. In association with such a demand, there is a tendency of thinning a wall of a raceway ring of a rolling bearing. Thus, a creep in which a fixed ring of the rolling bearing rotates relative to a housing might cause depending on a specification of the rolling bearing or a load condition. When the creep causes, the fixed ring and the housing rub against each other and the housing is worn, so that a failure of the rotary machine might cause.

Various countermeasures for preventing the above-described creep have been proposed. For example, Patent Document 1 discloses a specified coating film that is formed on an outer ring outer diametrical surface that is a fitting surface with a housing. The coating film is a baked film containing an organic binder formed of a base material and a curing agent, a solid lubricant powder, and a friction/wear modifier. The coating film is softer than a general material of the housing (for example, aluminum alloy), so that the wear of the housing is prevented even when the fixed ring and the housing rub against each other due to the creep.

PRIOR ART DOCUMENT

Patent Document

Patent Document 1: JP 6338035 B

SUMMARY OF THE INVENTION

Problems to be Solved by the Invention

In the coating film disclosed in Patent Document 1, antimony oxide is employed as the friction/wear modifier in order to obtain durability and wear resistance without wearing the housing. However, the antimony oxide is designated as a group-2 substance in Ordinance on Prevention of Hazards Due to Specified Chemical Substances because of its toxicity, and thus the antimony oxide is very hard to be handled because measuring of the working environment, installing of equipment to prevent the emission of the substance, and conducting of the special medical examination are mandatory. Accordingly, there is still room for improvement in handling property of the above-described coating film.

An object of the present invention is, in order to solve such problems, to provide a rolling bearing having superior handling property and creep resistance.

Means for Solving the Problems

A rolling bearing includes: an inner ring and an outer ring that are raceway rings, the outer ring being configured to be fitted to a fixed housing or the inner ring being configured to be fitted to a fixed shaft; a plurality of rolling elements interposed between the inner ring and the outer ring; and a surface coating film on an outer ring outer diametrical surface or an inner ring inner diametrical surface that is a fitting surface with the fixed housing or the fixed shaft. The surface coating film contains: a binder containing two or more kinds of thermosetting resins having different average molecular weights; and a solid lubricant. The solid lubricant contains molybdenum disulfide, polytetrafluoroethylene (PTFE) resin, and graphite.

The two or more kinds of the thermosetting resins may include polyamideimide (PAI) resin A having a weight-average molecular weight of 10,000 or more and 30,000 or less and PAI resin B having a weight-average molecular weight of 5,000 or more and less than 10,000.

A mass ratio of the PAI resin A and the PAI resin B may be set in a range between 20:80 and 50:50.

The solid lubricant may contain the PTFE resin of 2-6 by mass ratio, and the molybdenum disulfide of 7-12 by mass ratio, as the content of the graphite is set to 1.

A ratio of the content of the solid lubricant relative to the content of the binder may be 0.2-0.6.

An arithmetic mean roughness Ra of a face on which the surface coating film is formed may be 0.5 μm or less, and a kurtosis Sku of the face on which the surface coating film is formed may be 1 or more.

The two or more kinds of the thermosetting resins may include PAI resin A having a weight-average molecular weight of 10,000 or more and 30,000 or less and PAI resin B having a weight-average molecular weight of 5,000 or more and less than 10,000. A mass ratio of the PAI resin A and the PAI resin B may be set in a range between 20:80 and 50:50. The solid lubricant may contain the PTFE resin of 2-6 by mass ratio, and the molybdenum disulfide of 7-12 by mass ratio, as the content of the graphite is set to 1. A ratio of the content of the solid lubricant relative to the content of the binder may be 0.2-0.6. An arithmetic mean roughness Ra of a face on which the surface coating film is formed may be 0.5 μm or less, and a kurtosis Sku of the face on which the surface coating film is formed may be 1 or more.

The face on which the surface coating film is formed may be subjected to a manganese phosphate treatment, or a zinc phosphate treatment.

When the film thickness of the surface coating film is defined as h (μm) and the minimum thickness in the radial direction of the raceway ring on which the surface coating film is formed is defined as H (mm), the film thickness ratio (h/H) may be 1.54 or more.

The rolling bearing may be configured to be used in an automobile transmission.

Effect of the Invention

The rolling bearing of the present invention includes the surface coating film on the outer ring outer diametrical surface or the inner ring inner diametrical surface that is a fitting surface with the fixed housing or the fixed shaft. The surface coating film contains: the binder containing two or more kinds of the thermosetting resins having different average molecular weights; and the solid lubricant. Further, the solid lubricant contains molybdenum disulfide, PTFE resin, and graphite. According to this configuration, the attackability to a mating material such as the fixed housing and the fixed shaft is decreased, and both of low friction property and superior wear resistance of the surface coating film can be realized. The surface coating film does not contain antimony oxide that is hard to be handled, so that superior handling property and superior creep resistance can be realized.

The two or more kinds of the thermosetting resins includes the PAI resin A having a weight-average molecular weight of 10,000 or more and 30,000 or less and the PAI resin B having a weight-average molecular weight of 5,000 or more and less than 10,000. According to this configuration, the surface coating film can be cured under a condition in which a baking temperature is 150° C. or less and a baking time is 30 minutes or less. Consequently, a dimensional change of the bearing can be prevented.

Further, the mass ratio of the PAI resin A and the PAI resin B may be set in a range between 20:80 and 50:50. According to this configuration, the attackability to the mating material can be decreased and the wear resistance of the surface coating film can be improved.

The arithmetic mean roughness Ra of the face on which the surface coating film is formed is 0.5 μm or less, and the kurtosis Sku of the face on which the surface coating film is formed is 1 or more. According to this configuration, the surface coating film can be prevented from being peeled and thus the creep resistance can be improved.

When the film thickness of the surface coating film is defined as h (μm) and the minimum thickness in the radial direction of the raceway ring on which the surface coating film is formed is defined as H (mm), the film thickness ratio (h/H) is 1.54 or more. According to this configuration, for example, the creep can be prevented from causing in a bearing used under a general load condition.

MODE FOR CARRYING OUT THE INVENTION

Figure 1:
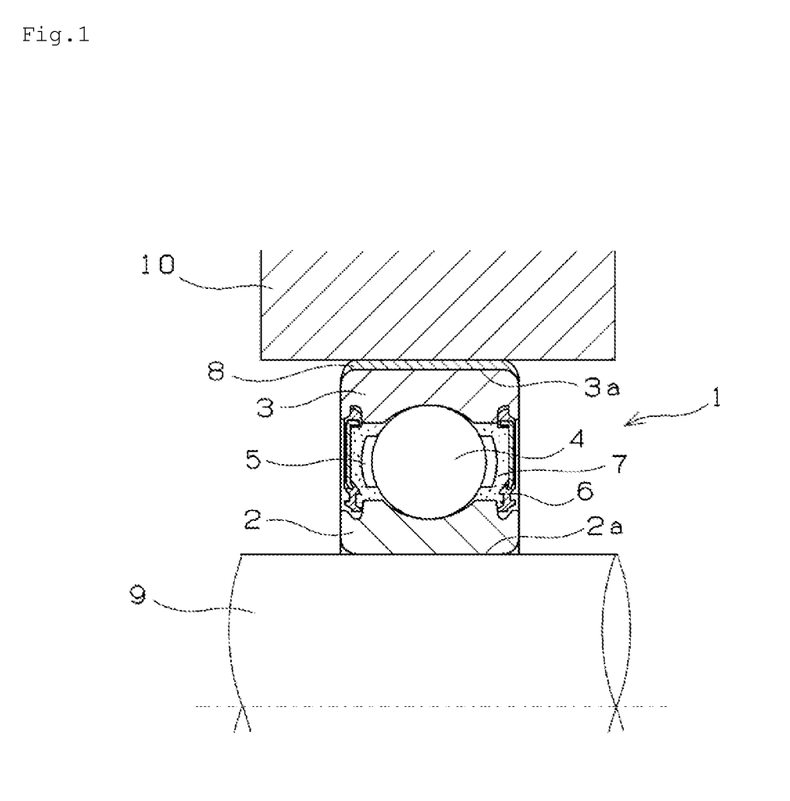
FIG. 1 is an enlarged sectional view showing an example of a rolling bearing according to the present invention.

One example of a rolling bearing according to the present invention is described with reference to FIG. 1. A rolling bearing 1 shown in FIG. 1 is used in, for example, an automobile transmission. The rolling bearing 1 has an inner ring 2 and an outer ring 3 that are raceway rings, and a plurality of balls (rolling elements) 4 interposed between the inner ring and the outer ring. The balls 4 are retained and aligned by a cage 5 at a same interval. A grease 7 is filled in a bearing space around the balls 4 and the bearing space is sealed by a seal member 6.

In the rolling bearing 1, each of the inner ring 2 and the outer ring 3 is formed of steel material. Any material generally used as a bearing material may be employed as the steel material. Examples of the steel material include high carbon chromium bearing steel (SUJ 1, SUJ 2, SUJ 3, SUJ 4, SUJ 5, and the like; JIS G 4805), cement steel (SCr 420, SCM 420, and the like; JIS G 4053), stainless steel (SUS 440C and the like; JIS G 4303), and cold-rolled steel. The ball 4 may be formed of the above-described steel material or a ceramic material.

As shown in FIG. 1, a rotational shaft 9 (for example, a rotational shaft installed in the automobile transmission) is inserted into a shaft hole of the rolling bearing 1 formed by an inner ring inner diametrical surface 2a. An outer ring outer diametrical surface 3a is fitted to a housing 10 (for example, a portion of a case of the automobile transmission). The housing 10 is formed of, for example, aluminum alloy or aluminum. The rolling bearing 1 is a inner ring rotating type bearing in which the outer ring 3 is fitted to a fixed housing. Thus, the inner ring 2 is a rotating ring and the outer ring 3 is a fixed ring. In an inner ring rotating type bearing, the outer ring outer diametrical surface 3a, which is a fitting surface with the housing 10, might slide on the housing 10 and thus the outer ring 3 might rotate relative to the housing 10. However, the rolling bearing 1 of the present invention has superior creep resistance because a surface coating film 8 is formed on the outer ring outer diametrical surface 3a, which will be described later. The surface coating film 8 does not contain antimony oxide. In the present invention, the creep resistance means to suppress wear of a mating material and wear of the coating film itself.

Figure 2:
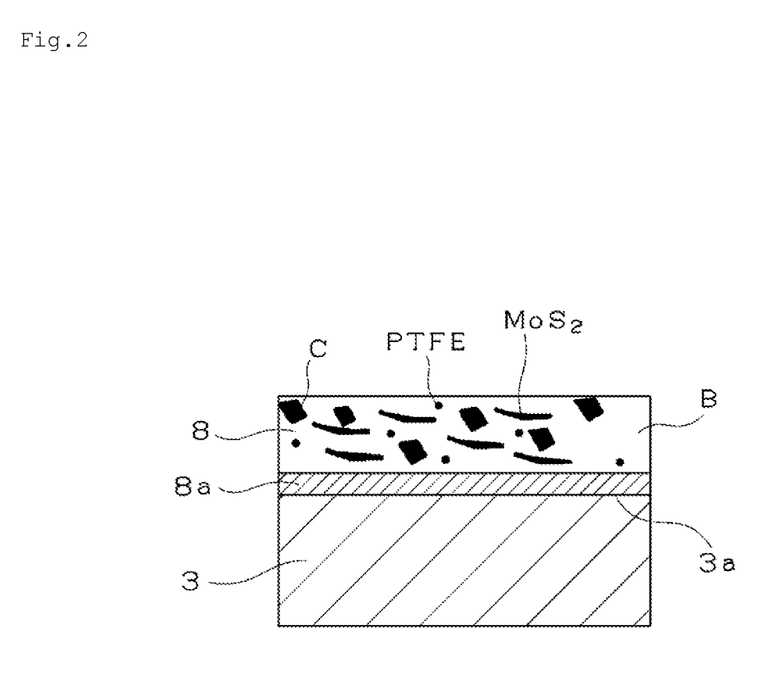
FIG. 2 is a sectional view explaining a surface coating film.

FIG. 2 is a general sectional view of the outer ring outer surface. In the example shown in FIG. 2, the surface coating film 8 is formed on the outer ring outer diametrical surface 3a. The outer ring outer diametrical surface 3a on which the surface coating film 8 is formed has been subjected to a surface treatment. As shown in FIG. 2, the surface coating film 8 contains a binder (B) containing two or more kinds of thermosetting resins having different average molecular weights, and a solid lubricant. In particular, the solid lubricant necessarily contains three components of molybdenum disulfide ($MoS_2$), PTFE resin, and graphite (C). The PTFE resin reduces the friction coefficient and further realizes low friction performance and superior wear resistance under a large load condition due to a synergistic effect with the molybdenum disulfide and the graphite.

The above-described three components of the solid lubricants are not especially limited, however it is preferable that the mass ratios of the three components increase from the graphite, the PTFE resin and the molybdenum disulfide in this order. Further, the solid lubricant preferably contains the PTFE resin of 2-6 by mass ratio, and the molybdenum disulfide of 7-12 by mass ratio, as the content of the graphite is set to 1. It has been known as a lubrication mechanism that the molybdenum disulfide has a layer lattice structure that easily shear-deforms into a thin layer due to a sliding motion so as to reduce the frictional resistance. The solid lubricant can further improve the low friction performance by containing the molybdenum disulfide most by mass ratio.

Considering the film thickness and the wear resistance of the surface coating film, the average particle diameter of each component of the solid lubricant is preferably 20 μm or less. More preferably, the average particle diameter of the molybdenum disulfide is 1-20 μm, the average particle diameter of the PTFE resin is 1-10 μm, and the average particle diameter of the graphite is 1-10 μm. The average particle diameter is measured by, for example, a particle diameter distribution measurement device using a laser light scattering method.

The PTFE resin is a general PTFE resin represented by —$(CF_2—CF_2)_n$—. Or alternatively, a modified PTFE resin in which a perfluoroalkylether group (—$C_p F_{2p}$—O—) (p is an integral number between 1 to 4), a polyfluoroalkyl group ($H(CF_2)_q$—) (q is an integral number between 1 to 20) or the like is introduced into the general PTFE resin can be employed. The PTFE resin or the modified PTFE resin may be obtained by means of a suspension polymerization method that obtains general molding powder, or an emulsion polymerization method that obtains fine powder. The PTFE resin obtained by baking the PTFE resin at a temperature of its melting point or more may be employed. The powder obtained by irradiating the baked powder with γ rays or electron rays may be also employed.

Any shape of a particle of the graphite among a scaly shape, a granular shape, a spherical shape, or the like can be employed.

The surface coating film may contain other solid lubricant such as tungsten disulfide, in addition to the above-described three components.

The binder B in the surface coating film 8 shown in FIG. 2 contains two or more kinds of thermosetting resins having different average molecular weights, and a curing agent as needed. The thermosetting resin having a larger average molecular weight (for example, a weight-average molecular weight of 10,000 or more and 30,000 or less) among the two or more kinds of thermosetting resins contributes to in particular enhancement of adhesiveness, and the thermosetting resin having a smaller average molecular weight (for example, a weight-average molecular weight of 5,000 or more and less than 10,000) contributes to in particular reduction of wear of a mating material. Each thermosetting resin in the binder B may employ any of PAI resin, polyimide (PI) resin, phenol resin, epoxy resin, and unsaturated polyester resin as long as the average molecular weights are different from each other. Of these resins, PAI resin or PI resin are preferable because of their high strength.

As the binder B, in particular, it is preferable that two or more kinds of PAI resins having the different weight-average molecular weights and the curing agent are combined. The curing agent is not especially limited, however epoxy resin is preferable as the curing agent in, for example, a base binder of the PAI resin. For example, the two kinds of PAI resins may combine PAI resin A having a weight-average molecular weight of 10,000 or more and 30,000 or less (preferably, 10,000 or more and 25,000 or less) and PAI resin B having a weight-average molecular weight of 5,000 or more and less than 10,000. In such a configuration, the PAI resin A having the larger molecular weight contributes to the enhancement of the adhesiveness by improving toughness, and the PAI resin B having the smaller molecular weight contributes to the reduction of the wear of the mating material. Their contents are preferably set such that PAI resin A:PAI resin B:curing agent=1-10:1-6:1 by mass ratio. Further, the mass ratio of the PAI resin A and the PAI resin B is preferably set in a range between 20:80 and 80:20, and more preferably set in a range between 20:80 and 50:50.

In a case in which coating the surface coating film containing the thermosetting resin is performed, baking is necessary for curing the surface coating film and thus the baking temperature might be high or baking time might be long. However, the thermosetting resin can be cured at a relatively low temperature for a short time by employing the curing agent such as the epoxy resin. For example, the baking condition of 150° C. or less and 30 minutes or less may be employed and the surface coating film can be baked at a temperature close to the tempering temperature of the bearing. As a result, the bearing can be prevented from deforming.

Further, a thermosetting resin (for example, PAI resin) having different weight-average molecular weight may be further combined with the above-described two kinds of the PAI resins having the different weight-average molecular weights. Further, the curing agent may be combined with the two or more kinds of the PI resins having different weight-average molecular weights.

In the surface coating film 8, a ratio of the content of the solid lubricant relative to the content of the binder (solid lubricant/binder) is preferably 0.2-1 by mass ratio. In a case in which the mass ratio is less than 0.2, the wear resistance of the surface coating film 8 might be deteriorated. In a case in which the mass ratio is more than 1, a holding performance of the solid lubricant might be deteriorated or attackability to the mating material might be increased. It is further preferable that the above-described mass ratio is 0.2-0.6 from a viewpoint of creep resistance. The content of the binder includes the curing agent such as an epoxy resin.

Further, various filling materials may be compounded into the surface coating film 8 in addition to the above-described binder and solid lubricant to an extent that does not deteriorate the advantageous of the present invention. For example, a fluorine based surfactant may be compounded into the surface coating film 8 in order to accelerate the dispersion of the PTFE resin.

As shown in FIG. 2, a face on which the surface coating film 8 is formed is preferably subjected to a surface treatment for enhancing the adhesiveness between the surface coating film 8 and the raceway ring. An example of the surface treatment includes a phosphating treatment such as a manganese phosphate treatment, a zinc phosphate treatment, and a calcium phosphate treatment. A treatment solution employed for the manganese phosphate treatment may contain other elements such as zinc and calcium. For example, in the phosphating treatment, the raceway ring, which is a base material, is immersed into the treatment solution, or the treatment solution is sprayed onto the surface of the raceway ring. A film thickness of the phosphate coating film formed through the phosphating treatment is, for example, 1-5 μm.

In order to enhance the adhesiveness between the raceway ring and the surface coating film 8, it is preferable that a face 8a subjected to the surface treatment has small crystal grain, is dense to be uniformized and has relatively high kurtosis on the surface. Specifically, relating to the surface roughness of the face 8a, the arithmetic mean roughness Ra is preferably 0.1-1.0 μm, and more preferably 0.1-0.5 μm. The arithmetic mean roughness Ra is defined by the standard of JIS B 0601 and is measured using a contact or non-contact type surface roughness tester.

The kurtosis Sku of the face 8a subjected to the surface treatment is preferably 1-10, more preferably 3-10. The kurtosis Sku is a surface roughness parameter defined by the standard of ISO 25178. The kurtosis Sku is a parameter that shows a height relative to a reference surface that is a face defined by an average height within a measured area. In a case in which the Sku is equal to 3, the surface roughness shows a normal distribution. In a case in which the Sku is more than 3, there are many sharp peaks and sharp pits on the surface. In a case in which the Sku is less than 3, the surface is flat. With the Sku within a range of 3-10, the adhesiveness of the surface coating film can be further enhanced.

In the example shown in FIG. 2, the phosphating treatment is performed as a surface treatment and thus the phosphate coating film is interposed between the surface coating film 8 and the outer ring 3, however it is not limited to this. A surface roughening treatment may be applied to the outer ring outer diametrical surface 3a as a surface treatment and then the surface coating film 8 may be formed directly on the outer ring outer diametrical surface 3a. Also in such a case, it is preferable that the above-described arithmetic mean roughness Ra and the kurtosis Sku are set within the above-described numerical ranges, respectively. Examples of the surface roughening treatment include a mechanical surface roughening method such as a shot blast method, an electrical surface roughening method such as a glow discharge treatment and a plasma discharge treatment, and a chemical surface roughening method such as an alkali treatment. Also in a case in which the phosphate coating film is interposed between the surface coating film 8 and the outer ring 3, the above-described surface roughening treatment may be applied to the outer ring outer diametrical surface 3a as needed.

Figure 3:
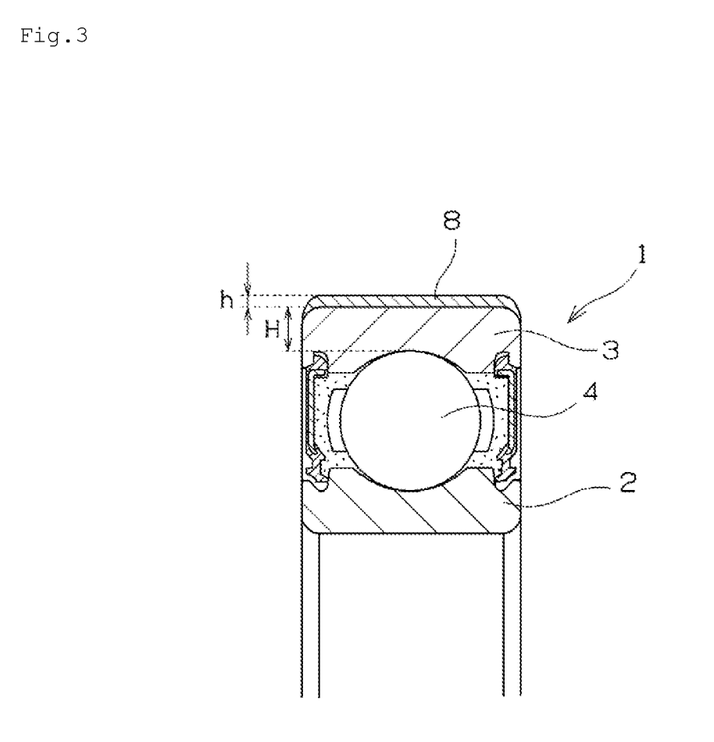
FIG. 3 is a sectional view explaining a film thickness ratio of the surface coating film in the present invention.

In the example shown in FIG. 3, the film thickness h of the surface coating film 8 is set to, for example, 10-50 μm. In particular, when the minimum thickness in the radial direction of the raceway ring on which the surface coating film 8 is formed is defined as H (mm), it is preferable that the film thickness h (μm) is set such that the film thickness ratio (h/H) is equal to or more than a specified threshold. As described in the below example, the present invention found a linear relationship between the film thickness ratio and the creep rate, and also found that the creep rate is decreased as the film thickness ratio is increased. Based on such knowledge, the film thickness ratio is set such that the creep rate is zero or more, namely the film thickness h is set to be equal to or more than the specified threshold, so that the creep is prevented from causing.

The above-described threshold is set based on a ratio (P/C) of an applied load (P) relative to a basic dynamic load rating (C) of the bearing. For example, in a case in which the ratio P/C is 0.1, the threshold is set to 1.54, and in a case in which the ratio P/C is 0.4, the threshold is set to 7.05. From such a viewpoint, for example, in a case in which the bearing is used such that the ratio P/C is equal to 0.1 or less and the minimum thickness H in the radial direction of the outer ring of the bearing is 4.04 mm, the film thickness h is preferably set to 6.3 μm or more.

The rolling bearing of the present invention has superior creep resistance and thus is suitable to a bearing on which the creep might cause. For example, the rolling bearing of the present invention is applied to a bearing used in an automobile transmission or a bearing for motor shafts.

The configuration of the rolling bearing of the present invention is not limited to the example shown in FIG. 1. For example, the example shown in FIG. 1 is a ball bearing, but the rolling bearing of the present invention can be applied to a tapered roller bearing, a cylindrical roller bearing, a self-aligning roller bearing, a needle roller bearing, a thrust cylindrical roller bearing, a thrust tapered roller bearing, a thrust needle roller bearing, or a thrust self-aligning roller bearing.

Further, the example shown in FIG. 1 is an inner ring rotating type bearing as the rolling bearing of the present invention, however the rolling bearing can be applied to an outer ring rotating type bearing. In a case of the outer ring rotating type bearing, the above-described surface coating film is formed on an inner ring inner diametrical surface that is a fitting surface with a fixed shaft.

EXAMPLE

Creep Wear Test

The components such as the binder and the solid lubricant were dispersed into N-Methyl-2-pyrrolidone by compound rates shown in Table 2 to form a coating liquid of each of Example 1 and Comparative examples 2 and 3. The curing agent in Table 2 is an epoxy resin. The weight-average molecular weight (Mw) of the PAI resin A in Table 2 is 20,000, and the weight-average molecular weight (Mw) of the PAI resin B in Table 2 is 5,600. A manganese phosphate treatment was applied as a surface treatment, to the outer ring outer diametrical surface of the test bearing, and then the coating liquid was applied on the outer ring outer diametrical surface. Thereafter, the test bearing was baked at 120° C. for 30 minutes to form the surface coating film on the outer ring outer diametrical surface. The film thickness of the surface coating film is approximately 20 μm.

Comparative example 1 employs a bearing (reference bearing) without the surface coating film thereon, as a test bearing.

The outer ring of the obtained test bearing was fitted into the housing formed of aluminum alloy. And then, the creep wear test was executed on the test bearing under a condition shown in Table 1 and the wear amount was evaluated. The result is shown in Table 2. The housing wear depth in Table 2 was measured from the shape of the inner diametrical surface of the housing that is a fitting surface with the bearing. Further, the bearing wear amount was measured from a difference of the outer diameter of the bearing before and after the test. The total wear is the sum of the housing wear depth and the bearing wear amount.

TABLE 1

| Creep wear test condition | |
| --- | --- |
| Test bearing | Deep groove ball bearing 6208 (inner diameter of 40 mm, outer diameter of 80 mm, and width of 18 mm) |
| Test load | 11.64 kN |
| Inner ring rotation speed | 4,000 r/minute |
| Lubrication oil | CVT fluid (amount: 200 mL/minute, oil supplying temperature: normal temperature) |
| Test time | 25 hours |
| Housing | Aluminum alloy |

TABLE 2

| | | | Example 1 | Comparative example 1 | Comparative example 2 | Comparative example 3 |
| --- | --- | --- | --- | --- | --- | --- |
| Surface coating film | Binder (mass %) | PAI resin A (Mw of 10,000 or more and 30,000 or less) | 29 | — | — | — |
| | | PAI resin B (Mw of 5,000 or more and less than 10,000) | 34 | — | — | — |
| | | Curing agent | 8 | — | — | — |
| | Solid lubricant (mass %) | Molybdenum disulfide | 20 | — | — | — |
| | | PTFE resin | 7 | — | — | — |
| | | Graphite | 2 | — | — | — |

TABLE 2-continued

|  |  | Example 1 | Comparative example 1 | Comparative example 2 | Comparative example 3 |
|---|---|---|---|---|---|
| Surface treatment | Antimony oxide | No | — | Yes | Yes |
|  | Manganese phosphate treatment | Yes | No | Yes | Yes |
| Evaluation | Housing wear depth (μm) | 4 | 55 | 5 | 3 |
|  | Bearing wear amount (μm) | 3.9 | 0 | 5.5 | 2.5 |
|  | Total wear (μm) | 7.9 | 55 | 10.5 | 5.5 |

As shown in Table 2, in Example 1 in which the surface coating film containing three components of the solid lubricants is formed, the wear resistance is remarkably improved compared to Comparative example 1 without the coating film. Further, the wear resistance of Example 1 is equivalent or more compared to Comparative examples 2 and 3 having the surface coating films containing the antimony oxide. The surface coating film of Example 1 does not contain the antimony oxide, so that superior handling property can be obtained compared to Comparative examples 2 and 3.

Next, the creep wear test was executed under the condition shown in Table 1 so as to evaluate an influence of the surface roughness of the face subjected to the surface treatment. In this test, presence/absence of peeling of the surface coating film was observed through visual check after the test. Each of the compositions of the surface coating films of Comparative examples 2 and 3 is the same as that of the above-described Example 1. The result is shown in Table 3.

TABLE 3

|  | Example 2 | Example 3 |
|---|---|---|
| Raceway ring | SUJ 2 | |
| Surface roughness Ra after surface treatment (μm) | 0.233 | 1.534 |
| Surface roughness Sku after surface treatment (μm) | 3.695 | 2.892 |
| Outer appearance after test | not peeled | peeled |

As shown in Table 3, the surface coating film was not peeled in Example 2, however a portion of the surface coating film was peeled in Example 3. According to this result, it is preferable that the surface roughness Ra of the face on which the surface coating film is formed is set to 1 or less (more preferably 0.5 or less).

Creep Rate Test

The surface coating film having the same composition as the above-described Example 1 was formed on the outer ring outer diametrical surface of each test bearing. The surface coating films have different film thicknesses, respectively. The outer ring of the obtained test bearing was fitted into the housing formed of aluminum alloy. And then, the creep rate test was executed on the test bearing under a condition shown in Table 4. In this test, a mark was added on a specified position in a circumferential direction of the outer ring and photographed using a video camera so that the rotating rate of the outer ring per minute was measured. The creep rate is calculated by converting the rotating rate into the moving amount of the mark per second. The result is shown in Table 5. Comparative example 1 employs the bearing without the surface coating film thereon. Further, the minimum thickness H in the radial direction of the outer ring of the deep groove ball bearing 6208 is 4.04 mm.

TABLE 4

| Creep rate test condition | |
|---|---|
| Test bearing | Deep groove ball bearing 6208 (inner diameter of 40 mm, outer diameter of 80 mm, and width of 18 mm) |
| Test load | 11.64 kN (Test load P/basic dynamic load rating C = 0.4) |
| Inner ring rotation speed | 6,000 r/minute |
| Lubrication oil | CVT fluid (amount: half of lowest rolling element is immersed) |
| Housing | Aluminum alloy |

TABLE 5

|  | Example 4 | Example 5 | Comparative example 1 |
|---|---|---|---|
| Film thickness h of surface coating film (μm) | 13.0 | 20.5 | — |
| Film thickness ratio (h/H) (μm/mm) | 3.2 | 5.1 | — |
| Creep rate (mm/second) | 0.6 | 0.3 | 1.1 |

As shown in Table 5, in each of Examples 4 and 5 having the surface coating films, the creep rate is largely decreased compared to Comparative example 1 without the coating film. Further, according to Examples 4 and 5, it is found that the creep rate is decreased as the film thickness of the surface coating film is larger in the rolling bearing having the same size. Thus, the creep rate is decreased as the film thickness ratio (h/H) is larger. The obtained relationship between the film thickness ratio and the creep rate is described with reference to FIG. 4.

Figure 4:
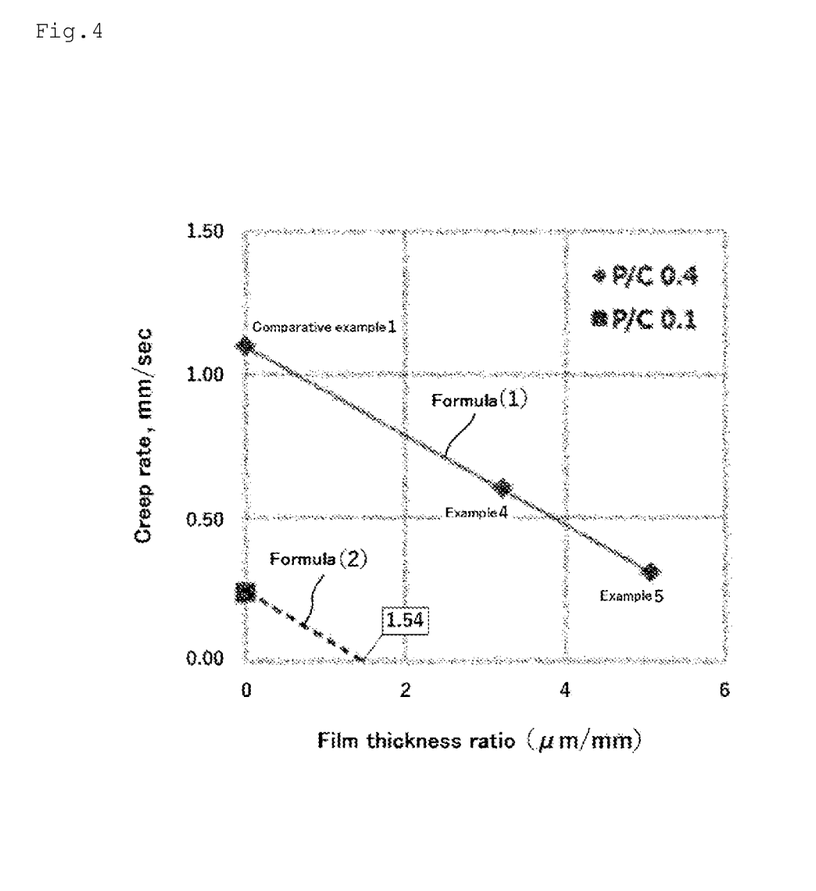
FIG. 4 is a graph showing a relationship between the film thickness ratio and a creep rate.

FIG. 4 is a graph in which a horizontal axis shows the film thickness ratio and a vertical axis shows the creep rate. As shown in FIG. 4, the relationship between the creep rate and the film thickness ratio is a linear relation (a linear function). An approximation that is calculated from the obtained result of the test as the creep rate is x and the film thickness is y, is represented by the following formula (1).

$$y = -0.156x + 1.10 \tag{1}$$

According to the above-described formula (1), the film thickness ratio when the creep rate is zero is 7.05. In this case, it is found that the film thickness ratio of 7.05 or more is necessary in order to suppress the creep under a high load condition of P/C=0.4.

However, an environment of usage under the high load condition such as P/C=0.4 is generally not so much. The configuration in which the coating liquid is applied such that the film thickness ratio is 7.05 or more is high in cost and it might be over engineered. Thus, the condition of P/C=0.1 which is used frequently in a field of an automobile transmission or the like is employed. When the creep rate test was executed using the bearing without the surface coating film (the film thickness ratio is zero) under the condition of P/C=0.1 (test load is 2.91 kN), the creep rate is 0.24 mm/second. The result is shown in the graph in FIG. 4.

In the graph shown in FIG. 4, when it is assumed that the relationship between the creep rate and the film thickness ratio under the condition of P/C=0.1 becomes a linear relation having the same slope as that under the condition of P/C=0.4, the relationship under the condition of P/C=0.1 is shown by a dashed line having the intercept of the test result using the reference bearing. The dashed line is represented by the following formula (2).

$$y = -0.156x + 0.24 \quad (2)$$

According to the above-described formula (2), the film thickness ratio when the creep rate is zero is 1.54. In this case, it is found that the film thickness ratio of 1.54 or more is necessary in order to suppress the creep under a low load condition of P/C=0.1.

In each of the above-described tests, the bearing having the specified model number is employed. However, the necessary film thickness for preventing the creep can be set for the bearing having the other model number based on the relationship between the creep rate and the film thickness ratio if the minimum thickness in the radial direction of the raceway ring has been known, similar to the example in which the film thickness ratio is 1.54 or more in a case of the low load (P/C=approximately 0.1) and the example in which the film thickness ratio is 7.05 or more in a case of the high load (P/C=approximately 0.4). The creep resistance is increased as the film thickness of the surface coating film is thicker, however the film thickness may be determined based on the productivity or the cost.

Block-On-Ring Test

Figure 5:
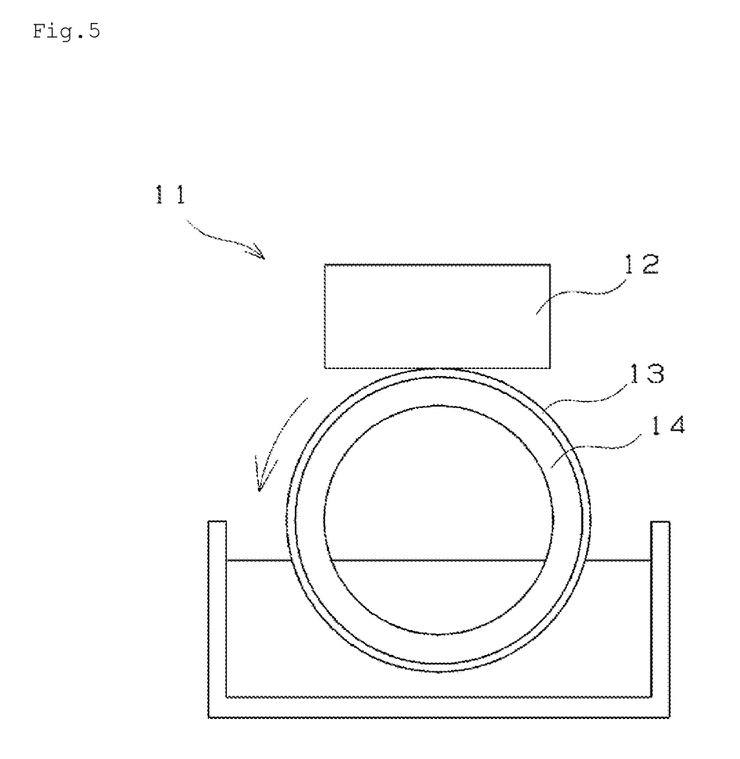
FIG. 5 is a general view showing a block-on-ring test.

Hereinafter, a block-on-ring test was executed as a reference example, so as to evaluate the composition of the surface coating film. As shown in FIG. 5, in the block-on-ring test, a ring 14 having a surface coating film 13 formed on a ring outer diametrical surface, is slid on a block 12 while rotating. The test condition is shown in Table 6. The ring employs SCM 420 in the test shown in Table 7, and the ring employs SUJ 2 in the test shown in Table 8. When the test was finished, a wear amount of the surface coating film and a wear amount of the block after 10,000 revolutions were measured.

TABLE 6

| | Block-on-ring test condition | |
|---|---|---|
| Test piece | Ring | SCM 420 (subjected to coating treatment) or SJU 2 (subjected to coating treatment) |
| | Block | A5052 |
| Tester | Triple block-on-ring tester | |
| Test | Load | 400N |

TABLE 6-continued

| | Block-on-ring test condition | |
|---|---|---|
| condition | Speed | 60 rpm |
| | Atmosphere | CVT fluid |
| | Temperature | 90° C. |
| Evaluation | Measuring wear amount of surface coating film and wear amount of block after 10,000 revolutions | |

The compositions of the surface coating films in the block-on-ring test are shown in Tables 7 and 8. The weight-average molecular weights (Mw) of the PAI resin A and the PAI resin B in Tables 7 and 8 are the same as that shown in Table 2. The weight-average molecular weight (Mw) of the PAI resin C in Tables 7 and 8 is 22,000. A manganese phosphate coating film having the same surface roughness is interposed between each surface coating film and the ring. The results are shown in Tables 7 and 8.

TABLE 7

| | | | Reference example 1 | Reference example 2 |
|---|---|---|---|---|
| Surface coating film | Binder (mass %) | PAI resin A (Mw of 10,000 or more and 30,000 or less) | 28 | 0 |
| | | PAI resin B (Mw of 5,000 or more and less than 10,000) | 34 | 0 |
| | | PAI resin C (Mw of 10,000 or more and 25,000 or less) | 0 | 62 |
| | | Curing agent | 9 | 9 |
| | Resin mass ratio (A:B:C) | | 45:55:0 | 0:0:100 |
| | Solid lubricant (mass %) | Molybdenum disulfide (a) | 20 | 20 |
| | | PTFE resin (b) | 7 | 7 |
| | | Graphite (c) | 2 | 2 |
| | Solid lubricant mass ratio (a:b:c) | | 68:24:8 | 68:24:8 |
| | Solid lubricant/Binder | | 0.41 | 0.41 |
| | Film thickness of surface coating film (μm) | | 19.2 | 20 |
| Evaluation | Friction coefficient | | 0.07 | 0.08 |
| | Ring wear (μm) | | 0.9 | 0.6 |
| | Block wear (μm) | | 5 | 15 |

The composition of the surface coating film of Reference example 1 shown in Table 7 is substantially the same as that of the above-described Example 1. The surface coating film of Reference example 2 employs one kind of PAI resin C as the thermosetting resin of the binder. According to the result, the block wear amount of Reference example 2 is larger than that of Reference example 1, and thus the attackability to the mating material of Reference example 2 is high.

TABLE 8

| | | | Reference example 3 | Reference example 4 | Reference example 5 | Reference example 6 | Reference example 7 | Reference example 8 |
|---|---|---|---|---|---|---|---|---|
| Surface coating film | Binder (mass %) | PAI resin A (Mw of 10,000 or more and 30,000 or less) | 28 | 21 | 28 | 40 | 51 | 63 |
| | | PAI resin B (Mw of 5,000 or more and | 34 | 0 | 0 | 23 | 12 | 0 |

TABLE 8-continued

|  |  |  | Reference example 3 | Reference example 4 | Reference example 5 | Reference example 6 | Reference example 7 | Reference example 8 |
|---|---|---|---|---|---|---|---|---|
|  |  | less than 10,000) |  |  |  |  |  |  |
|  |  | PAI resin C (Mw of 10,000 or more and 25,000 or less) | 0 | 26 | 34 | 0 | 0 | 0 |
|  |  | Curing agent | 9 | 6 | 9 | 8 | 8 | 8 |
|  | Resin mass ratio (A:B:C) |  | 45:55:0 | 45:0:55 | 45:0:55 | 63:37:0 | 82:18:0 | 100:0:0 |
|  | Solid lubricant (mass %) | Molybdenum disulfide (a) | 20 | 32 | 20 | 20 | 20 | 20 |
|  |  | PTFE resin (b) | 7 | 11 | 7 | 7 | 7 | 7 |
|  |  | Graphite (c) | 2 | 4 | 2 | 2 | 2 | 2 |
|  | Solid lubricant mass ratio (a:b:c) |  |  |  | 68:24:8 |  |  |  |
|  | Solid lubricant/Binder |  | 0.41 | 0.88 | 0.41 | 0.41 | 0.41 | 0.41 |
| Evaluation | Ring wear (μm) |  | 0 | 1.1 | 0.4 | 4.2 | 6.2 | 1.3 |
|  | Block wear (μm) |  | 7.6 | 193 | 46 | 13.3 | 17.5 | 16.2 |

The composition of the surface coating film of Reference example 3 shown in Table 8 is the same as that of the above-described Reference example 1. According to the result of Reference example 4, the block wear amount becomes large as the ratio of the solid lubricant is higher in the surface coating film, and thus the attackability to the mating material is high. According to the results of Reference example 5 (PAI resin A and PAI resin C), Reference example 8 (only PAI resin A), and the above-described Reference example 2 (only PAI resin C), it is preferable that the PAI resin A and the PAI resin B are combined as the thermosetting resin from a viewpoint of the attackability to the mating material. Further, according to the results of Reference examples 3, 6 and 7, it is preferable that the content of the PAI resin B having the weight-average molecular weight of 5,000 or more and less than 10,000 is larger than the content of the PAI resin A having the weight-average molecular weight of 10,000-30,000 from a viewpoint of the wear resistance.

INDUSTRIAL APPLICABILITY

The rolling bearing of the present invention has superior handling property and creep resistance. Thus, the rolling bearing of the present invention is suitable to a bearing on which the creep might cause, and for example, may be applied to a bearing of an automobile transmission.

REFERENCE SIGNS LIST

1: rolling bearing
2: inner ring
2a: inner ring inner diametrical surface
3: outer ring
3a: outer ring outer diametrical surface
4: ball (rolling element)
5: cage
6: seal member
7: grease
8: surface coating film
8a: face subjected to surface treatment
9: rotational shaft
10: housing (fixed housing)
11: block-on-ring tester
12: block
13: surface coating film
14: ring

The invention claimed is:

1. A rolling bearing comprising:
an inner ring and an outer ring that are raceway rings, the outer ring being configured to be fitted to a fixed housing or the inner ring being configured to be fitted to a fixed shaft;
a plurality of rolling elements interposed between the inner ring and the outer ring; and
a surface coating film on an outer ring outer diametrical surface or an inner ring inner diametrical surface that is a fitting surface with the fixed housing or the fixed shaft,
wherein:
the surface coating film contains: a binder containing two or more kinds of thermosetting resins having different average molecular weights; and a solid lubricant, and
the solid lubricant contains molybdenum disulfide, polytetrafluoroethylene resin, and graphite.

2. The rolling bearing as defined in claim 1, wherein the two or more kinds of the thermosetting resins include polyamideimide resin A having a weight-average molecular weight of 10,000 or more and 30,000 or less and polyamideimide resin B having a weight-average molecular weight of 5,000 or more and less than 10,000.

3. The rolling bearing as defined in claim 2, wherein a mass ratio of the polyamideimide resin A and the polyamideimide resin B is set in a range between 20:80 and 50:50.

4. The rolling bearing as defined in claim 1, wherein the solid lubricant contains the polytetrafluoroethylene resin of 2-6 by mass ratio, and the molybdenum disulfide of 7-12 by mass ratio, as the content of the graphite is set to 1.

5. The rolling bearing as defined in claim 1, wherein a ratio of the content of the solid lubricant relative to the content of the binder is 0.2-0.6.

6. The rolling bearing as defined in claim 1, wherein:
an arithmetic mean roughness Ra of a face on which the surface coating film is formed is 0.5 μm or less, and
a kurtosis Sku of the face on which the surface coating film is formed is 1 or more.

7. The rolling bearing as defined in claim 6, wherein the face on which the surface coating film is formed is subjected to a manganese phosphate treatment, or a zinc phosphate treatment.

8. The rolling bearing as defined in claim 1, wherein:
the two or more kinds of the thermosetting resins include polyamideimide resin A having a weight-average molecular weight of 10,000 or more and 30,000 or less and polyamideimide resin B having a weight-average molecular weight of 5,000 or more and less than 10,000,
a mass ratio of the polyamideimide resin A and the polyamideimide resin B is set in a range between 20:80 and 50:50,
the solid lubricant contains the polytetrafluoroethylene resin of 2-6 by mass ratio, and the molybdenum disulfide of 7-12 by mass ratio, as the content of the graphite is set to 1,
a ratio of the content of the solid lubricant relative to the content of the binder is 0.2-0.6,
an arithmetic mean roughness Ra of a face on which the surface coating film is formed is 0.5 μm or less, and
a kurtosis Sku of the face on which the surface coating film is formed is 1 or more.

9. The rolling bearing as defined in claim 1, wherein, when the film thickness of the surface coating film is defined as h (μm) and the minimum thickness in the radial direction of the raceway ring on which the surface coating film is formed is defined as H (mm), the film thickness ratio (h/H) is 1.54 or more.

10. The rolling bearing as defined in claim 1, wherein the rolling bearing is configured to be used in an automobile transmission.

* * * * *